United States Patent [19]
Jones et al.

[11] 3,934,340
[45] Jan. 27, 1976

[54] CUTTING BLADE EDGE CONSTRUCTION FOR MECHANICALLY ACTUATED SHEARS

[75] Inventors: John E. Jones; Lynn D. Lineback, both of Danville, Va.

[73] Assignee: Disston, Inc., Pittsburgh, Pa.

[22] Filed: Aug. 23, 1974

[21] Appl. No.: 500,140

[52] U.S. Cl. ................ 30/220; 30/222; 30/DIG. 1
[51] Int. Cl.² ........................................ B26B 19/06
[58] Field of Search ........ 30/DIG. 1, 220, 222, 223, 30/224, 225, 221, 228; 56/293, 296, 246, 247, 288, 17.6, 236, 237

[56] References Cited
UNITED STATES PATENTS

| | | | |
|---|---|---|---|
| 360,374 | 3/1887 | Clough | 30/223 X |
| 2,652,626 | 9/1953 | Dutcher | 30/220 X |
| 3,193,925 | 7/1965 | Hawley | 30/223 X |
| 3,218,710 | 11/1965 | Bruck | 30/222 |
| 3,564,714 | 2/1971 | Wells | 30/223 |
| 3,623,223 | 11/1971 | Edgell | 30/222 X |
| 3,763,638 | 10/1973 | Vogelenzang | 56/293 |

*Primary Examiner*—Al Lawrence Smith
*Assistant Examiner*—J. C. Peters
*Attorney, Agent, or Firm*—B. B. Olive

[57] ABSTRACT

Pairs of planar cutting blades with angularly related cutting edges such as are used in grass shears, and the like, and which are mechanically actuated to move relative to each other and to cut by a scissors-like action are formed in a manner such that during each cutting action the contacting cutting point between each pair of coacting edges moves at a uniform speed. The improved blade construction finds application in shears, particularly cordless, i.e., battery, grass shears, by more nearly equalizing incremental power requirements; by reducing the maximum input power requirements; and by increasing time of performance between battery recharging at a given forward advancement speed of the shear.

18 Claims, 12 Drawing Figures

CUTTING BLADE EDGE CONSTRUCTION FOR MECHANICALLY ACTUATED SHEARS

BACKGROUND OF THE INVENTION

1. Field of the Invention:

The invention is broadly related to cutting devices in the nature of shears and more particularly to mechanically actuated shears. More specifically, the invention is directed to mechanically actuated shears of the type in which the blades are generally flat or planar in nature and provide pairs of angularly related coacting edges which move relative to each other and cut with a scissors-like action. Shears of this type include cordless grass shears to which the invention is particularly directed.

2. Description of the Prior Art:

It is, of course, known to cut with both hand operated, e.g., scissors, pruning shears, and the like, and powered cutting devices, e.g., AC and battery powered grass shears. It is also known to shear with essentially parallel cutting edges moving relative to each other, e.g., as in a powered sheet metal shear. In contrast, hand as well as powered scissors, grass shears, hedge clippers, and the like, perform the cutting action with what may be termed a scissors type action. The scissors type cutting action can be characterized by observing that it involves pairs of blades whose coacting cutting edges perform their cutting action by moving the edges together in some angular relation such that the point of blade edge intersection, i.e., the "cutting point", moves outwardly. This action can be observed in an ordinary pair of hand scissors in which the pivoted blades ordinarily wipe against each other at the cutting point. A type of scissors-like action can also be observed in a conventional hedge trimmer where the triangular shaped teeth of one blade move with respect to the teeth of the other blade and between each pair of coacting cutting edges the cutting point moves outwardly at some speed as the edges move through a cutting action.

The subject of improving the shape and nature of cutting edges which cut in a scissors-like action have been the subject of prior patents both with regard to mechanically actuated as well as hand actuated cutting devices. See, for example, U.S. Pat. No. 636,473 directed to a blade edge construction for a pair of hand operated scissors and U.S. Pat. No. 3,316,636 directed to a mechanically actuated pair of blades which operate in a more linear rather than a scissors-like action. One can observe the shapes of pruning shears, pinking shears, surgical shears, and other manually operated scissors-like cutting devices to realize that blade shape significantly affects both the ability to grasp as well as the ability to cut particular materials. It can also be observed from the numerous prior art cutting devices which operate in a scissors-like manner that blade shapes which lend themselves to hand operated cutting operations do not necessarily lend themselves to cutting when the same blade shapes are mechanically actuated and particularly at relatively high speeds. Also, different materials lend themselves to being cut at different speeds as illustrated by use of variable speed drills.

Various electrical powered shears have long been known such as electric hedge clippers, and the like. In an early U.S. Pat. No. 432,433 there is a teaching of an electric vibrator type battery powered shear. As to shear blade construction, the use of a fixed blade having a set of teeth in conjunction with a movable blade having a set of mating teeth such that grass is caught and sheared between the tooth edges is also old in the art. This general blade construction is found in mowers for cutting hay and tall grass as well as in hedge trimmers. However, considerable power is required to move such blades and the blade fingers are generally rigid, inflexible and heavy in weight. Such characteristics are required when cutting hay, tall heavy grass, and the like. The blade edges have generally been formed as straight edges and this practice has existed for many years. Since large amounts of power have been available, e.g., gasoline engines, AC motors, there has been no particular concern for refinements in blade efficiency, blade power, speed of cutting, or the like. However, the modern suburban home has many small areas and narrow edges of substantially light grass around trees, flower gardens, shrubs, sidewalks, animal fencing, adjacent steps, and the like. In this environment, the source of power is limited since many of these areas and edges are remote from electrical receptacles and the prior art, until recently, did not provide a dependable, lightweight, cordless type shear specifically for cutting small light grass areas and edges to keep the same trim and neat. Consequently, refinements in conventional cutting practices become more important.

While apparently not previously recognized, a characteristic obtained in a mechanically driven reel type lawn mower having a helical and flat blade is that the cutting point moves at a uniform speed while the helical blade is driven at a uniform speed.

To meet the needs of the modern suburban home, an improved lightweight portable battery powered grass shear was introduced into the market in recent years and is best described in U.S. Pat. No. 3,623,223. The type of cordless shear described in this patent has proved to be extremely popular particularly for cutting small narrow width grass areas and edges associated with suburban homes as previously described. As best explained in the patent, this type of shear employs as blades a pair of thin metal plates at one end of which the cutting teeth are formed. By fixing the bottom blade and using a battery powered motor to reciprocate the top blade on a pivotal mount, the individual teeth of the top blade wipe the teeth of the bottom blade and a scissors-type cutting action is obtained. The teeth have been formed with straight cutting edges and it can be observed in this type of shear that the reciprocated top blade teeth in their to and fro movement move from zero speed to a maximum speed and then back to a zero speed in each cutting cycle. Thus, it can also be observed that the cutting edges of the top blade teeth are moving at a non-uniform speed and that the power requirements for driving the reciprocated top blade vary substantially during a cutting cycle. It also means, as the present invention observes, that when the coacting edges of the respective teeth are formed as straight lines and the top blade is driven at a non-uniform speed that the contacting cutting point between each pair of contacting edges on the top and bottom blade teeth moves at a non-uniform speed. Thus, the power required to cut the same material at one cutting point is or may be substantially different from the power required to cut at another cutting point.

Stated in a more general context, the prior art has heretofore failed to recognize the significance of blade shape on cutting in a scissors-like action when the blades are mechanically actuated in a manner to cause the contacting cutting point between each pair of coacting edges to move at a widely varying speed rather than at a uniform speed.

SUMMARY OF THE INVENTION

The invention is broadly directed to cutting blade edge shapes and to providing pairs of mechanically actuated cutting blades which are intended to move relative to each other and cut in a scissors-like action with the edges shaped so that as the blades go through repetitive cutting actions under mechanical power the contacting cutting point between each pair of coacting edges moves at a uniform speed during each cutting action even though the blade edges move at a non-uniform speed.

The blade edge construction of the invention is particularly useful in cordless shears where battery life, cutting efficiency and ability to cut particular materials become significantly more important than is the case where the blades are powered from substantially large and effectively unlimited sources of power. The specific embodiment described is based on improving the type of shear shown in U.S. Pat. No. 3,623,223.

In the type of shear described in the patent, the bottom blade is fixed, the top blade is pivoted on the bottom blade and the top blade is reciprocated back and forth by a gear driven cam device from a battery powered motor. Thus, even though the cam turns at a relatively uniform speed the top blade teeth move at a non-uniform speed. The invention observes that this inherently means that with the conventional straight tooth edges the cutting point moves at a non-uniform speed during each cutting action.

The shape of the teeth of the bottom grass shear blade in the embodiment described has been designed so that the grass is cut at a uniform cutting speed. In general, the shape is determined by identifying the lengths of segments of a line formed by the procession of the point of contact between upper and lower cutting blades and relating these equal lengths of segments to equal motor and gear speeds as measured by angles of arc per unit time. The shape of the cutting edge of grass shear blades is such that the rate or speed of cutting (defined as the rate or speed at which the contact point of the cutting edges of the upper and lower portions of the blade components advances along the cutting edges of the bottom blade) is uniform such that the peak incremental power requirements for cutting are reduced and such that the peak input power requirements are reduced and the performance times are increased for a given forward rate of advancement.

A general object of the invention is to provide an improved form of blade edge construction for scissors-like cutting.

A more specific object is to provide an improved blade construction for cordless cutting devices such as cordless grass shears, trimmers, and the like.

These and other objects of this invention will become apparent when the following detailed description is read in conjunction with the accompanying drawings.

DESCRIPTION OF THE PREFERRED EMBODIMENT

While the invention has general application to both manually as well as mechanically actuated blades of the type which cut by a scissors-like action, the invention has proven itself especially useful in cordless grass shears of the type shown in U.S. Pat. No. 3,623,223 and which is used as a basis for the description to follow. From this description, it is believed those skilled in the art will readily appreciate the broader significance of the invention and its immediate application to other types of cutting devices.

Figures 1, 2, 3:
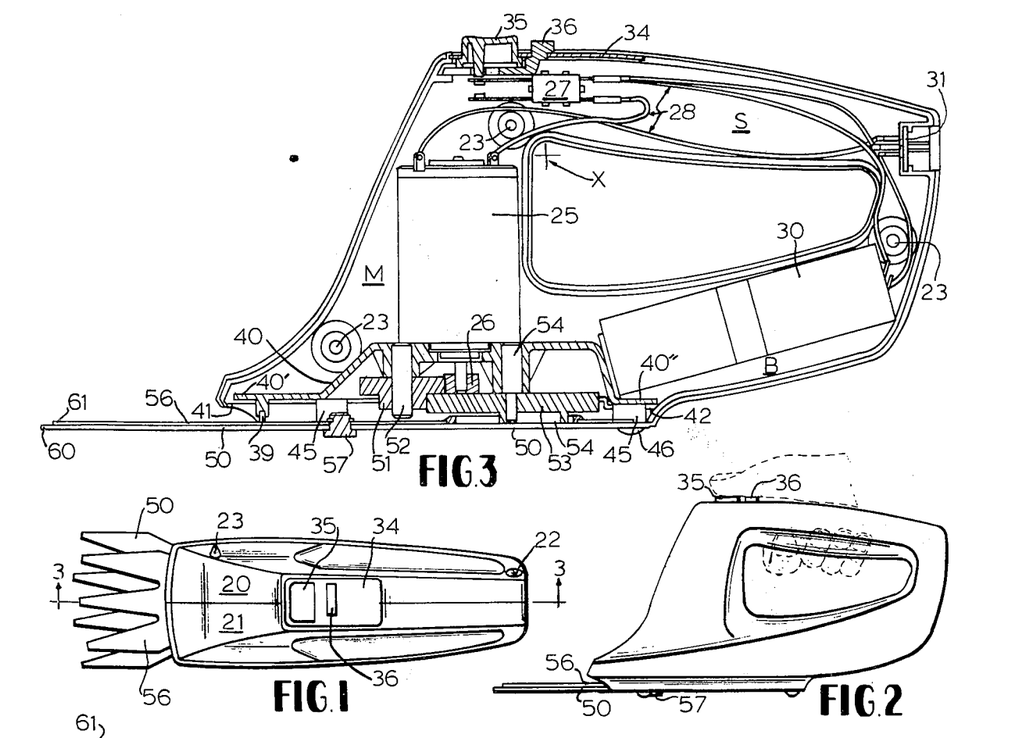
FIG. 1 is a plan view of a prior art type of cordless shear of a type adapted to incorporate the improved blade construction of the invention.
FIG. 2 is a side elevation view of the shear and in dashed lines showing the hand position.
FIG. 3 is an enlarged section view taken along line 3—3 of FIG. 1.

In the embodiment of the invention shown in FIGS. 1 through 8, a cordless grass shear of the type shown in U.S. Pat. No. 3,623,223 is illustrated. While the invention is primarily directed to the blades and the blade cutting edge shapes, it is deemed necessary to explain how the prior art shear is constructed and operates to fully understand the relation of the improved blade construction to such a shear. In this type of shear, a right housing 20 is joined to a left housing 21 by means of screws 22 which mount in screw insets 23 provided in the right housing 20. The housing which is molded of lightweight plastic, provides a front vertical tubular compartment M in which is vertically disposed a substantially high speed DC motor 25 on whose shaft is securely mounted a cast or stamped pinion gear 26. The housing further provides a substantially horizontal tubular compartment S forming a handle portion as best shown in FIG. 2, and which provides room for internal mounting of control switch 27 and associated wiring 28. Below compartment S and rearwardly of compartment M is a third substantially horizontal tubular compartment B in which is disposed a rechargeable and normally elongated battery pack of two batteries 30 having a terminal 31 mounted at the rear of the housing and suited to connecting to an AC source through suitable recharging circuitry. Forwardly of the handle formed by compartment S, the housing mounts a plate 34 in which are disposed a manual switch button 35 and a switch lock 36 by which button 35 may be locked in an off position when not in use.

The base of housing halves 20, 21 are molded with mating front and rear ledges 41, 42 which support an aluminum metal cast base 40 by base edges 40', 40''. Base 40 in turn has four integral and downwardly projecting posts 45 which receive four screws 46 which secure the bottom blade 50 to base 40 and which allows bottom blade 50 to serve as a bottom cover.

Figures 4, 5, 6, 7, 8:
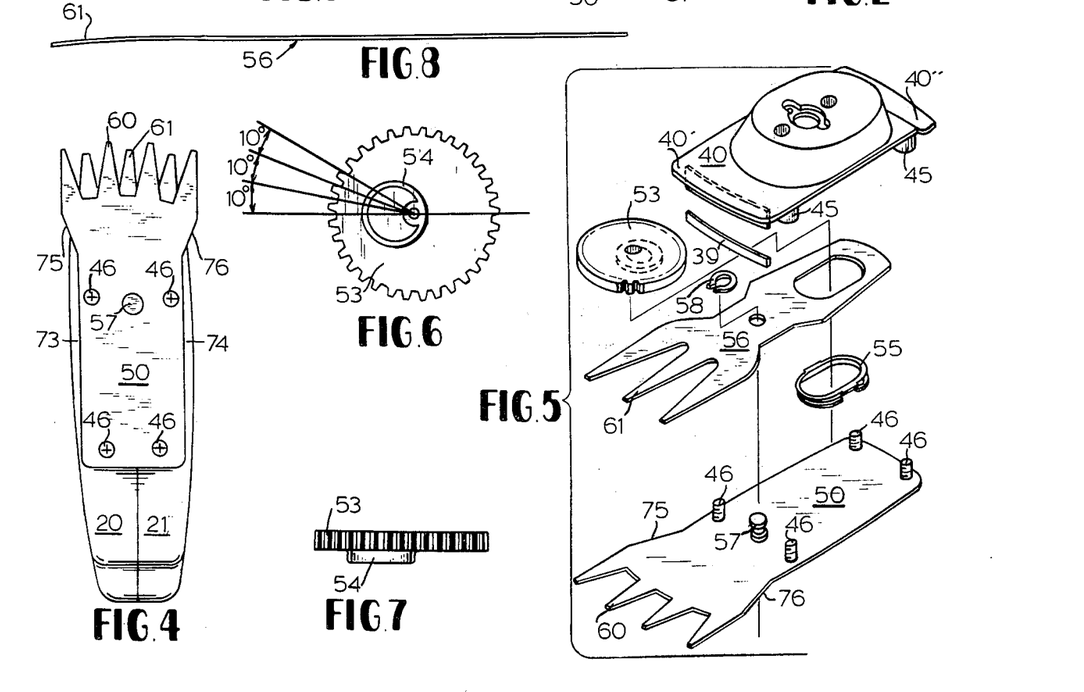
FIG. 4 is a bottom view of the shear.
FIG. 5 is an exploded view of the blades and blade gear drive assembly.
FIG. 6 is a bottom view of the blade drive gear.
FIG. 7 is an elevation view of the blade drive gear.
FIG. 8 is an enlarged elevation view of the upper blade to show its curvature.

Pinion gear 26 rotates at the relatively high speed of motor 25 and drives a combination gear 51 which may be formed of nylon and which rotates on fixed stub shaft 52 and in turn drives spur gear 53, formed of nylon, or the like, which rotates on stub shaft 54. As best shown in FIGS. 5, 6, and 7, spur gear 53 includes an integral drive cam 54 which wipes against a plastic bearing insert 55. Insert 55 mounts in the upper movable blade 56 so that as gear 53 rotates, blade 56 is pivoted back and forth on pin 57 which passes through fixed blade 50. Lock ring 58 is mounted on pin 57 as shown in FIG. 5 which makes upper blade 56 and bottom blade 50, once worn, removable and replaceable as an assembly by removing and replacing the four screws 46. Thus, as the grass which is intended to be cut by the shear of the invention is caught between teeth 60 of fixed lower blade 50 and teeth 61 of pivotal upper blade 56 a shearing action is effected between opposed edges of the respective teeth. In order to obtain a wiping or drawing effect at the cutting point similar to that obtained in a pair of scissors, the teeth 61 of upper blade 56 at their forward ends are given a slight downward curvature as shown in FIG. 8. A dust pad 39 prevents entry of grass cuttings, dirt, and the like, into the gear mechanism.

Since one purpose of the invention is to provide a relatively lightweight and weight balanced portable, cordless type shear that can be used by the housewife for light grass shearing in locations not adapted to the usual gasoline or AC powered heavy shearing equipment, it was previously recognized that a departure from heavy, thick, and rigid type blades is required. In particular, it will be noted that the shear with only four teeth 60 in the lower fixed blade 50 and three teeth 61 in the upper pivotal blade 56 is designed for a relatively narrow cut which inherently reduces the battery power consumed and lengthens life between charges. Furthermore, blades 50 and 56, instead of being cast or otherwise being made relatively inflexible, thick and heavy as with heavy duty hedge clippers, shears, and the like, are instead stamped out of relatively thin metal strips and upper blade 56 in a preferred form is made substantially thinner than lower blade 50 and both blades may be coated with material to reduce friction. The teeth of the upper blade 56, are thinner, longer and more flexible than teeth 60 of lower blade 50 and both blades are lightweight. Also, each tooth of upper blade 56 becomes independently flexible of one another in such a construction. Lower blade teeth 60 also preferably project slightly ahead of upper blade teeth 61 so that if the operator strikes a brick wall, rock, or the like, reciprocating upper teeth 61 do not contact the same.

Figure 9:
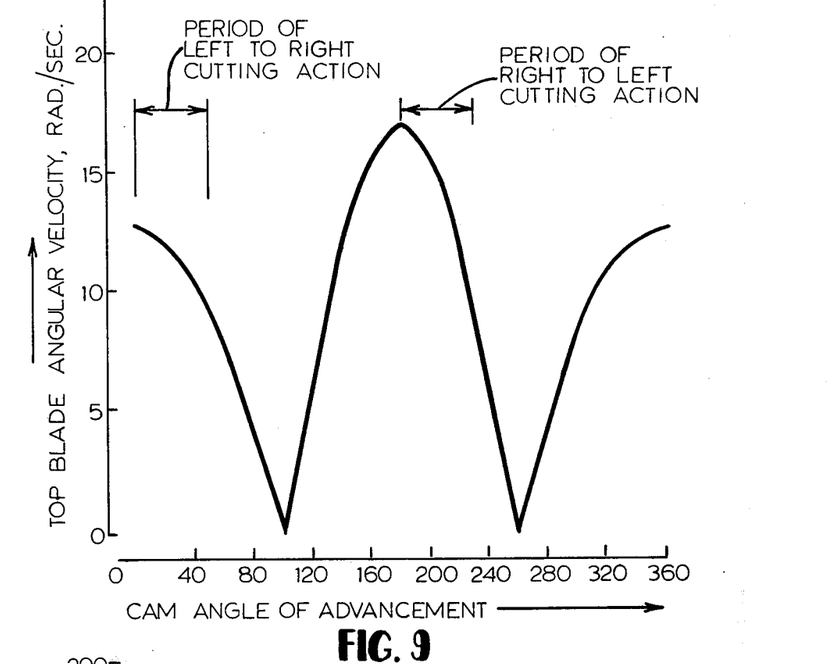
FIG. 9 is a generalized curve illustrating how the angular speed of the top blade teeth varies in a shear of the type depicted in FIG. 1.

What has been thus far described in connection with FIGS. 1 through 8 has been a description of the type of prior art cordless grass shear to which the invention has been applied and found useful. Before proceeding next to a description of the improved blade construction, certain observations associated with the invention concerning the manner in which such a shear operates will be reviewed. In particular, in FIG. 6 several radial lines of equal angular spacing, e.g., 10°, have been superimposed on drive cam 54 and it can be observed that these spacings effectively represent equal time spacings on the assumption that cam 54 operates continuously and at a relatively uniform speed. However, it can be easily observed that top blade teeth 61 move between zero and some maximum speed as generally illustrated in FIG. 9 due to the back and forth reciprocation of top blade 56. It can also be observed that when the edges of shear blade teeth 60, 61 are made as straight edges according to prior art practices, the contacting cutting point of each pair of coacting cutting edges will move at some non-uniform cutting speed throughout the cutting action as generally illustrated in FIG. 10.

Stated differently, the prior art practices in blade constructions employed with pairs of blades and used to cut in a scissors-like action has failed to observe the significance of blade shape with respect to the speed of the cutting point. For this reason, the material being cut is cut over a wide range of speeds dependent solely on where the material engages the coacting cutting edges during their closure in a cutting action. For example, heretofore with a cordless grass shear of the type described, any grass caught between a pair of teeth at the point where they are just beginning to close will be cut at a substantially different speed than if caught between the same pair of teeth near the end of their closure and cutting action.

Figure 10:
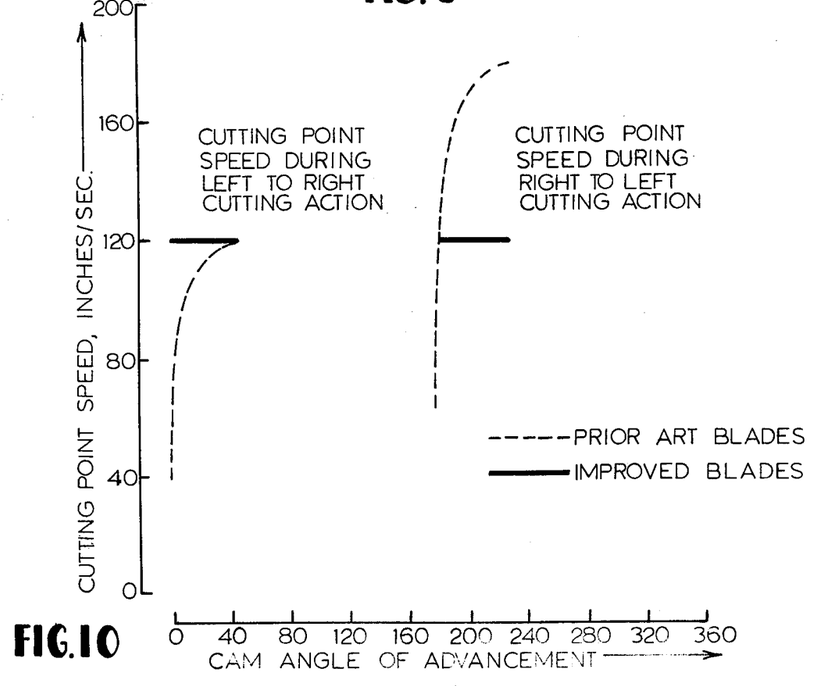
FIG. 10 compares with generalized curves the speed of the cutting contact point associated with conventional blades as found in the conventional FIG. 1 type shear with the speed of the cutting contact point when the same type shear is fitted with blades made according to the invention.
Figure 11:
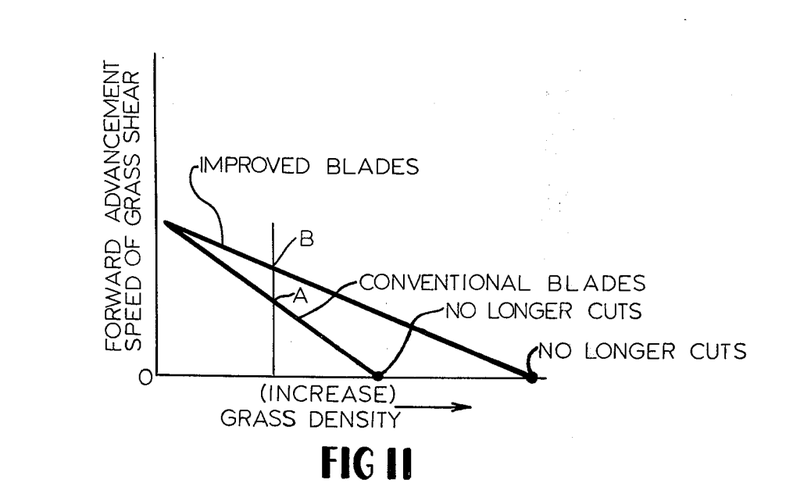
FIG. 11 illustrates with generalized curves the behavior of the conventional shear blades used with the FIG. 1 type shear as compared to the behavior of the improved blades of the invention with respect to the ability to sustain a forward cutting speed with increased density of material being cut, e.g., grass.

Before reverting to a more detailed description of the new blade construction, the significance of the invention can be seen by making reference to FIGS. 10 and 11. In FIG. 10, it will be noted that the cutting contact point moves at some speed which is maintained uniform during the actual time that cutting takes place. This, of course, means that such cutting speed can be designed for particular materials since it is known that different materials respond to different speeds of cutting. In FIG. 11, there is also illustrated another general comparison of how the conventional and improved blades respond to grass density. Note in FIG. 11 that at any particular grass density, the improved blades of the invention operate at a higher forward cutting speed B than does the conventional blades at the lower speed A. Also, note that another characteristic is that blades made according to the improved invention will also continue to cut higher density grass after the conventional blades have reached the point of discharging the batteries.

Referring back to the more specific details of the invention, it should again be noted from FIG. 5 that the edges of conventional upper and lower blade teeth 60 and 61 are made as bevelled straight edges which means that the cutting point advances at a non-uniform speed (see FIG. 10). In contrast, according to the invention, the shape of the cutting edge of grass shear blades is such that the rate of speed of cutting during a cutting action, defined as the rate or speed at which the contact point of the coacting cutting edges of the upper and lower portions of the blade components advances along the cutting edge of the bottom blade, is uniform or substantially uniform such that the incremental power requirements for cutting are more clearly equalized and such that the peak power requirements for cutting are reduced and such that the peak input power requirements are reduced and the performance times are increased for a given forward rate of advancement of the shear.

In general, the shape is determined by identifying the lengths of segments of a line formed by the procession of the point of contact between upper and lower cutting blades and relating these equal lengths of segments to equal motor and gear speeds as measured by angles of arc moved per unit time. Because electrical motors are essentially variable speed, variable torque machines, cutting blades designed and operated according to the invention will not necessarily operate at constant power; however, the peak power level may be noticeably reduced for economy of design. This blade construction can be applied to any number of shearing devices including those covered by U.S. Pat. No. 3,623,223, and in other types elsewhere mentioned.

Figure 12:
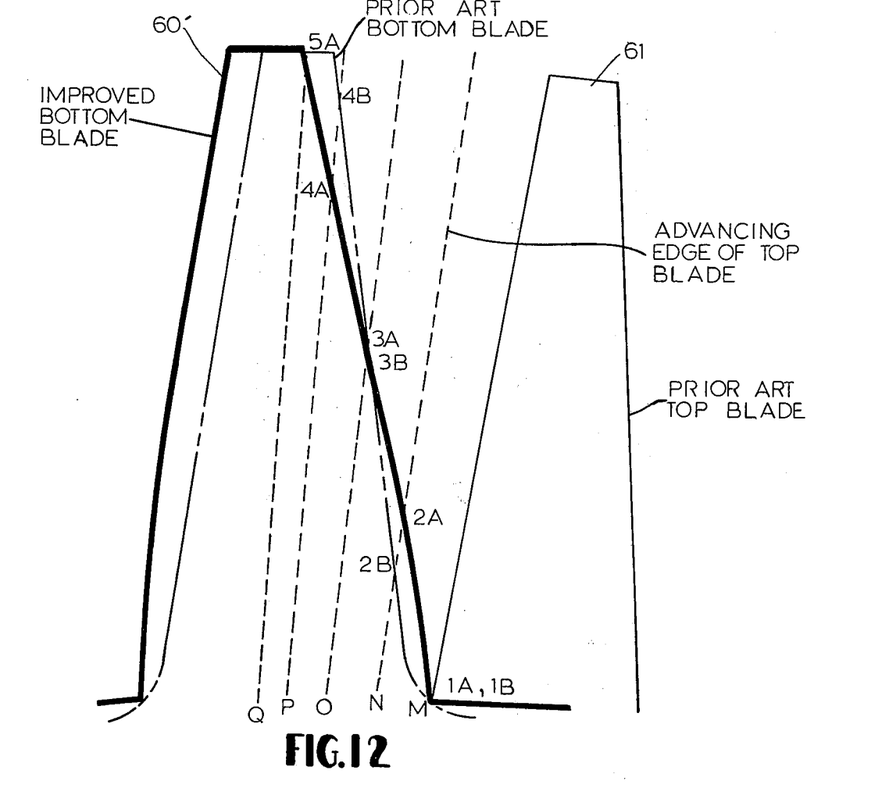
FIG. 12 is an enlarged view of one tooth portion of a bottom blade made according to the present invention and its relation to an upper blade tooth. The upper blade is shown lightly and the dashed lines indicate the position of the upper blade in respect to the lower blade at various equal time intervals.

Referring specifically to FIG. 12, lines M, N, O, P and Q represent 10° increments of rotation of drive cam 54 as it goes through that portion of its rotation which causes top blade 56 and its teeth to move relative to bottom blade 50 and perform a scissors-like cutting action. The spacing between lines M, N, O, P and Q thus represent equal time increments. The distances between M and N, N and O, O and P, and between P and Q, are determined by the characteristics of the mechanical drive previously described and best seen in FIGS. 1 and 5. While the principles of the invention can be applied by changing the shape of both the bottom and top blade teeth or by changing the shape of the top blade teeth, the embodiment illustrated in FIG. 12 is based on retaining the straight edge shape of the top blade teeth identified as 61 in FIG. 12 while modifying the shape of the lower blade teeth, identified as 60' in FIG. 12.

In FIG. 12, the designation A refers to the bottom blade shape of the invention while the designation B refers to the prior art bottom blade shape. As previously mentioned, lines M, N, O, P and Q represent the advancing cutting edge line of the top blade and it may be assumed that the view in FIG. 12 is as if one were looking down on the blades as in FIG. 1. With the foregoing in mind, the intersection designated 1A, 1B represents the first cutting contact point. 2B represents the contact cutting point obtained by the intersection of line N with the prior art blade shape whereas 2A represents the contact point obtained by the intersection of line N with the improved blade shape of the invention. 3A and 3B represent a coinciding cutting point obtained respectively at the intersection of line O on both the conventional and improved bottom blade shapes. 4A can be seen to represent the intersection of line P with the conventional blade shape whereas 4B represents the intersection of the same line P with the blade shape of the invention and 5A represents a terminating cutting point of contact with line Q.

With the foregoing FIG. 12 description in mind, it can be seen that a blade shape obtained by connecting points 1A, 2A, 3A, 4A and 5A provides a blade shape in which the distances 1A-2A, 2A-3A, 3A-4A, and 4A-5A are equal. Thus, since the time intervals between lines M and N, N and O, O and P, and P and Q are equal, the cutting speed at which the cutting contact point moves from 1A to 2A to 3A to 4A and to 5A is uniform. The sharp contrast with the conventional blade can be seen by noting, for example, that the distance between conventional blade points 1B and 2B is substantially shorter than between points 2B and 3B which inherently means that for the equal time intervals indicated by the space between lines M—N and N—O, respectively, the contacting cutting point speed must change and be non-uniform because of the differences in distances required to be traveled in the same unit of time.

While the description has primarily dealt with application of the invention to a pair of blades having a pivotal connection and with one blade fixed and the other driven, it is recognized that the desired relative movement of the coacting cutting edges can be obtained with either or both blades in motion. Also, the cutting edges of either or both blades may be modified according to the teaching of the invention. It is also contemplated that the relative movement and scissor-like action may be obtained as in hedge trimmers, and the like, where one or both angularly toothed blades reciprocate in a linear rather than in an arcuate path as in the cordless grass shear embodiment previously described.

While special advantages arise when the invention is applied to cordless cutting devices, it is also recognized that the blade shapes of the invention will find application in AC powered, gasoline motor powered, and similar heavy duty shears, and the like, since the blade shapes according to the invention will allow a reduction in peak power requirements and will enable a uniform cutting speed as in light duty cordless devices. The cutting of hair, carpet tufts, wool and materials other than grass, can be achieved with vastly improved overall cutting efficiency.

Particular cutting devices will vary widely as the invention is applied. In the cordless shear embodiment used as an example, the mechanical and electrical components are made as set forth in U.S. Pat. No. 3,623,223 except, of course, for the blade construction whose design was according to the present invention. Mechanically actuated scissors, hedge shears, shrub trimmers, sickle bar type mowers, grass trimmers, metal cutting shears, and similar devices having two relatively movable coacting cutting edges which execute repetitive cutting actions by having the material to be cut fed between the edges to be progressively cut at a moving cutting point as one edge moves relative to the other at some relative angular disposition. In the type of cordless shear having a pivoting blade as used for illustration, in mechanically actuated scissors, and the like, the angle between the coacting blade edges, of course, changes as the cutting point moves during cutting whereas in sickle bars, hedge trimmers, and the like, it may be noted that the angle included between the coacting blade edges does not change even though the cutting point moves as the blades execute their repetitive relative motions. Also, in those types of rotary mowers, shears, and the like, in which there is a pair of mechanically driven blades which cut by rotation of one blade relative to the other, the cutting point moves and the angle included between the coacting cutting edges changes as in other examples mentioned above. Thus, in all these examples, the invention may be usefully applied so that the relatively movable blades are designed to cause the cutting point to move at a uniform speed during each cutting action.

Thus, a wide range of portable and non-portable electrically powered, gasoline powered, pneumatically and hydraulically powered, as well as tractor drawn, cutting devices lend themselves to the blade construction of the invention. All such devices having two coacting edges on blades which are mechanically actuated in some manner to obtain relative movement and cutting action in which the blade edges repetitively close in some angular relation to cause the cutting point to move or progress as described may be designed according to the invention. Grass density and grass toughness or resistance to cutting is known to vary widely. Thus, actual speeds of the cutting point of any device will vary from device to device and even the same device may exhibit a change in cutting point speed with a change in type of material being cut. Thus, the description and drawings should be considered as illustrating a "design" and not any particular operating condition. For example, with the embodiment illustrated, the cutting point speed may vary fron one type grass to another because of the limits of cordless power; but, with a particular material grass being in all respects uniform, the cutting point speed will remain uniform at some particular speed determined by the actual operating conditions. In any event, those skilled in the art will readily appreciate the many and varied applications to which the invention may be applied, whether in a true scissors-like action where one or both of the blades are curved to effect wiping and a positive point contact as in the embodiment described or in other types of devices which operate in a less scissors-like manner but with a pair of planar blades. The term "planar" is thus meant to include blades which are formed generally flat or planar in nature as in grass shears, hedge trimmers, and the like, whether or not curved for wiping purposes, and to exclude non-planar cutting blades, as, for example, helical blades used in reel-type lawn mowers.

We claim:
1. A cutting apparatus comprising:
 a. a mechanical drive source;
 b. mounting means for said drive source; and
 c. a pair of planar cutting blades having a predetermined number of coacting cutting edges for cutting material caught therebetween, said blades being mounted on said mounting means for repetitive relative movement and having a drive connection to said drive source whereby the respective coacting edges of said blades move in a repetitive angular relation and repetitively execute cutting actions, said coacting edges being shaped such that during each such cutting action the contacting cutting point between each pair of coacting edges moves at a uniform speed.

2. A cutting apparatus as claimed in claim 1 wherein said cutting blades comprise a pair of cutting blades each formed with a plurality of cutting teeth and one of which blades is fixed on said mounting means and the other of which is arranged to reciprocate thereon whereby respective plural coacting edges of said teeth effect said cutting actions.

3. A cutting apparatus as claimed in claim 2 wherein the teeth of said blades are formed with a predetermined relative curvature designed to effect a wiping action at the contacting cutting point during said cutting actions.

4. A cutting apparatus as claimed in claim 2 wherein said blades are formed of strips of sheet metal with said teeth being formed on respective mated ends thereof, including means pivotally mounting the said movable blade on the said fixed blade and wherein said drive connection drives said movable blade in a reciprocatory motion to effect said cutting actions.

5. A cutting apparatus as claimed in claim 3 wherein said drive source comprises an electric motor and gear means driven thereby.

6. A cutting apparatus as claimed in claim 2 wherein said blades are formed of sheet metal strip with said teeth being formed on respective mated portions thereof.

7. In a portable shear adapted to shearing a width of growing material including grass, shrubbery, and the like, of the type having:
 a. a housing having an electric motor disposed therein;
 b. a first cutting blade having a plural number of cutting teeth and extending forwardly from said housing;
 c. a second cutting blade having a plural number of cutting teeth and extending forwardly from said housing, said blades being positioned to mate the respective said teeth for relative movement in a repetitive angular relation for operative shearing action; and
 d. drive means mounted in said housing and connecting said motor to drive at least one of said blades whereby said first blade teeth are reciprocated relative to said second blade teeth to cause the respective coacting tooth edges to execute repetitive said shearing actions while said relative movement proceeds at a non-uniform speed; the improvement comprising:
 e. the coacting cutting edges of said teeth being shaped such that while said relative movement proceeds at said non-uniform relative speed, the contact cutting point between each pair of coacting edges of said teeth moves at a uniform speed during each such shearing action performed therewith.

8. In a portable shear as claimed in claim 7 wherein the respective cutting edges of said first blade teeth are formed as straight edges and the respective cutting edges of said second blade teeth are shaped as curved edges to provide said uniform speed of the cutting point.

9. In a portable shear as claimed in claim 7 wherein said first blade is secured to said housing and said second blade pivots thereon and said drive means reciprocates said second blade.

10. In a portable shear as claimed in claim 7 wherein both said blades are mounted to reciprocate to provide said relative movement.

11. In a portable shear as claimed in claim 7 wherein said motor comprises a battery operated motor and including a battery mounted in said housing and connected to energize said motor.

12. In a portable shear as claimed in claim 11 wherein said teeth are formed on respective mated forward ends of said blades, said first blade is secured to said housing, said second blade is mounted to pivot on said first blade and said drive means reciprocates said second blade at a non-uniform angular velocity to establish said non-uniform speed of relative movement.

13. A portable shear comprising;
 a. a housing having a motor disposed therein;
 b. handle means secured to said housing; and
 c. a pair of planar blades having a predetermined number of coacting cutting edges for shearing material caught therebetween, said blades being mounted on said housing for repetitive relative movement and having a drive connection to said motor whereby the respective coacting edges of said blades move in a repetitive angular relation and repetitively execute cooperative shearing actions, said coacting edges being shaped such that during each such shearing action the contacting cutting point between each pair of coacting edges moves at a uniform speed.

14. A portable shear as claimed in claim 13 wherein said blades comprise a first reciprocating blade and a second fixed blade.

15. A portable shear as claimed in claim 13 wherein said motor comprises a battery operated electric motor and said housing has battery means disposed therein and connected to energize said motor.

16. A portable shear as claimed in claim 15 wherein said blades comprise a first reciprocating blade and a second fixed blade.

17. A portable shear as claimed in claim 16 wherein said blades are provided with mated plural coacting teeth having plural cooperative coacting cutting edges for executing said cooperative shearing actions.

18. A portable shear as claimed in claim 17 wherein the teeth on one of said blades are shaped with straight cutting edges and the teeth on the other of said blades are shaped with curved cutting edges to provide said uniform contacting cutting point speed.

* * * * *

UNITED STATES PATENT OFFICE
CERTIFICATE OF CORRECTION

Patent No. 3,934,340          Dated January 27, 1976

Inventor(s) John E. Jones; Lynn D. Lineback

It is certified that error appears in the above-identified patent and that said Letters Patent are hereby corrected as shown below:

Col. 7, line 52, "conventional" should be --improved--.

Col. 7, line 52, "improved" should be --conventional--.

Col. 7, line 54, "conventional" should be --improved--.

Col. 7, line 56, --conventional-- should be inserted before "blade".

Col. 7, line 56, "of the invention" should be deleted.

*Signed and Sealed this*

*second Day of August 1977*

[SEAL]

Attest:

RUTH C. MASON
*Attesting Officer*

C. MARSHALL DANN
*Commissioner of Patents and Trademarks*